T. M. HARDY.
UNIVERSAL JOINT AND MEANS FOR RETAINING LUBRICANT THEREIN.
APPLICATION FILED JUNE 28, 1918.

1,357,320.

Patented Nov. 2, 1920.

2 SHEETS—SHEET 1.

INVENTOR
THOMAS M. HARDY
BY
ATTORNEYS

T. M. HARDY.
UNIVERSAL JOINT AND MEANS FOR RETAINING LUBRICANT THEREIN.
APPLICATION FILED JUNE 28, 1918.
1,357,320.
Patented Nov. 2, 1920.
2 SHEETS—SHEET 2.
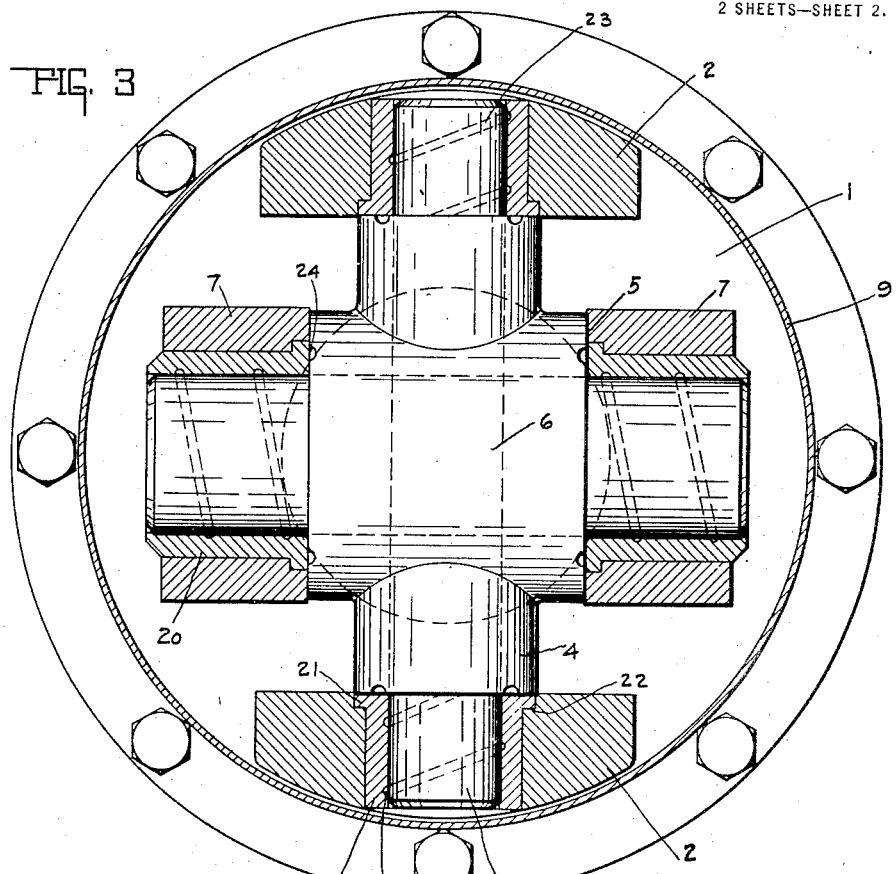
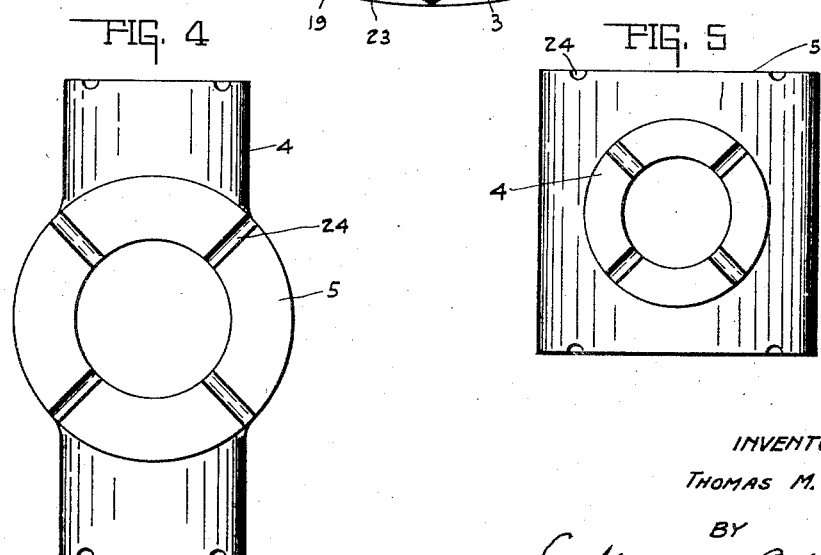
INVENTOR
THOMAS M. HARDY.
BY
Lockwood & Lockwood
ATTORNEYS

UNITED STATES PATENT OFFICE.

THOMAS MORRIS HARDY, OF PENDLETON, INDIANA.

UNIVERSAL JOINT AND MEANS FOR RETAINING LUBRICANT THEREIN.

1,357,320.

Specification of Letters Patent.

Patented Nov. 2, 1920.

Application filed June 28, 1918. Serial No. 242,403.

*To all whom it may concern:*

Be it known that I, THOMAS M. HARDY, a citizen of the United States, and a resident of Pendleton, county of Madison, and State of Indiana, have invented a certain new and useful Universal Joint and Means for Retaining Lubricant Therein; and I do hereby declare that the following is a full, clear, and exact description thereof, reference being had to the accompanying drawings, in which like numerals refer to like parts.

This invention relates to universal joints and means for retaining lubricant therein, and the prime feature of the invention is in providing a housing around the parts of the universal joint, parts of which are provided with an opening to permit the passage of the shaft coöperating therewith, the universal joint having a fibrous absorbent ring arranged in the recess formed in the housing. Coöperating with said housing is a sealing shield, likewise having an absorbent ring which bears against the inner face of the housing, while the ring carried by the housing bears against the outer face of the sealing shield, the two rings preventing passage of lubricant through the shaft opening in the housing.

A further feature of the invention is the provision of means for constantly forcing the sealing shield toward the housing so as to keep the absorbent rings constantly in touch with the parts with which they coöperate. A further feature of the invention is the provision of removable bushings in connection with the pivot parts of the universal joint, which have spiral grooves therein for the passage of lubricant, and a further feature of the invention is the provision of grooves in the ends of the projecting parts of the cross member of the universal joint for properly conveying lubricant to the pivotal parts.

Other objects and advantages will be hereinafter more fully set forth and claimed.

Figure 1:
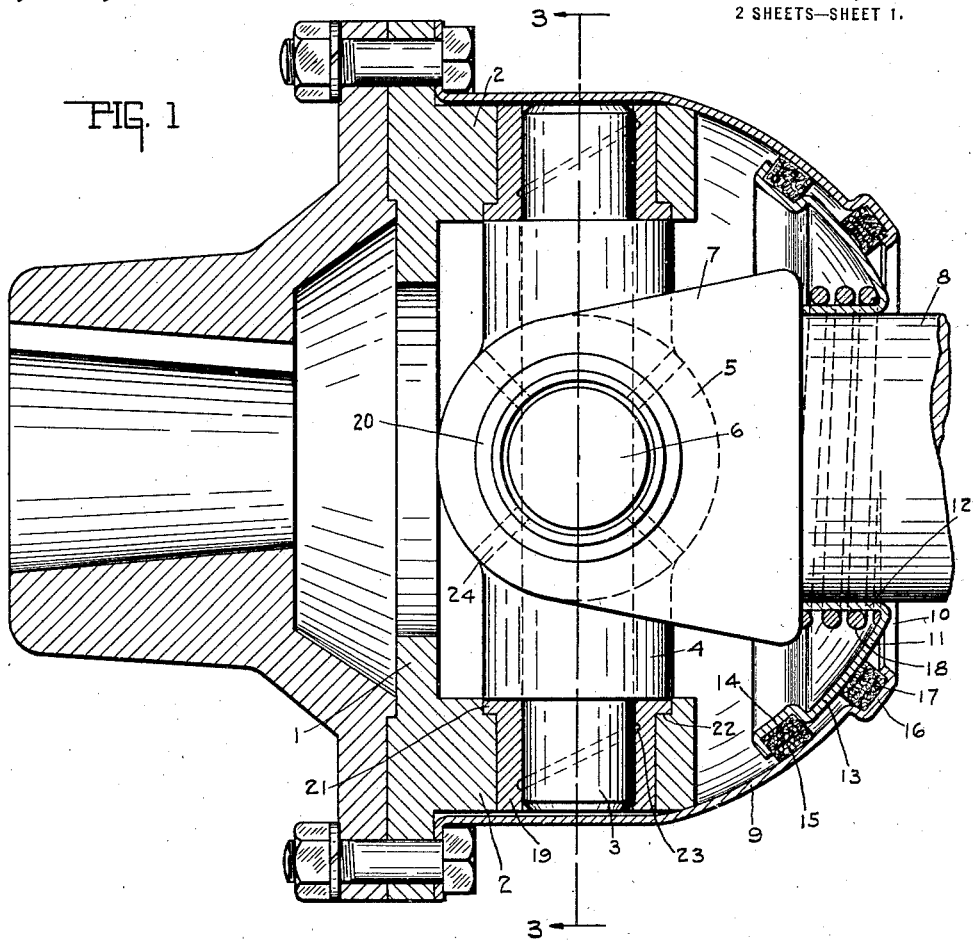
Figure 2:
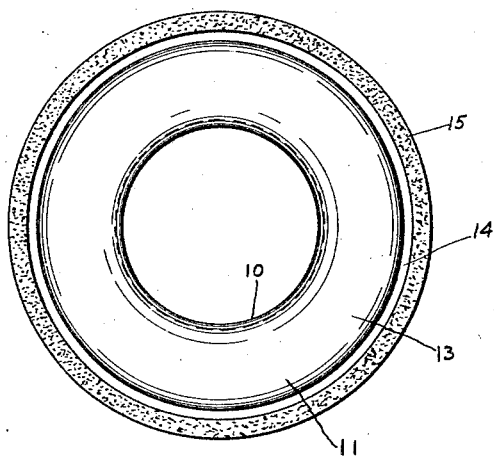

In the drawings, Figure 1 is a central longitudinal sectional view through a universal joint showing the improved sealing mechanism in operative position. Fig. 2 is an end elevation of the sealing mechanism removed from the universal joint. Fig. 3 is a sectional view as seen on line 3—3 of Fig. 1. Fig. 4 is a side elevation of the cross member of the yoke, and Fig. 5 is an end elevation thereof.

Referring to the drawings in which similar reference numerals designate corresponding parts throughout the several views, 1 indicates a flange yoke which is of the usual construction used in connection with universal joints, the laterally extending arms 2 thereof forming bearings for a pivot pin 3 of the cross member 4.

The cross member 4 is provided at its longitudinal center with oppositely extending hub members 5 through which projects the king pin 6 employed for attaching the yoke 7 of the driving shaft 8, to the cross member 4, and by providing this form of structure it will be seen that when the shaft 8 is rotated the flange yoke 1 will likewise be rotated and that said flange yoke 1 can be swung at an angle to the axial trend of the shaft 8 without interfering with the rotation of the yoke and parts attached thereto, said cross member, flange yoke and shaft yoke, together with their pivoting members forming a universal joint.

Surrounding the universal joint structure is a housing 9 having an opening 10 for the passage of the shaft 8, said opening being of considerable larger diameter than the diameter of the driving shaft whereby the housing may be shifted with the movement of the flange yoke and parts attached thereto without coming into contact with the driving shaft.

The housing 9 is provided with a quantity of lubricant so as to keep the parts of the universal joint thoroughly lubricated and to prevent escape of the lubricant through the opening 10, means is provided for sealing or closing the opening as to the egress of lubricant, or as to the ingress of foreign particles from the outside of the housing. To this end a sealing shield 11 of spherical shape is provided, which comprises a sleeve portion 12 which fits snugly around the driving shaft 8, the outer end of the sleeve terminating in an apron 13 which is curved to correspond to the contour of that portion of the housing 9 adjacent the opening 10, the sealing shield being substantially angular shaped in cross section.

Adjacent the free edge of the apron portion 13 of the shield, a channel 14 is formed by bending parts of the apron and in said channel is positioned a ring 15 preferably of absorbent material which ring presses against the inner curved face of the housing 9.

To more effectively seal the space between the apron 13 and the spherical housing 9, parts of said housing are bent to form a channel 16 which is adjacent the opening 10 and in said channel 16 is positioned a ring 17, likewise preferably of absorbent material and which presses against the outer curved face of the apron 13. The sealing shield 11 is pressed outwardly, so as to securely bind the ring 15 with the inner face of the housing 9 and the outer face of the apron 13 with the ring 17 by introducing a coil spring 18 around the sleeve 12, the ends of which press against the yoke 7 and the apron 13 respectively, thereby constantly directing outward pressure against the sealing shield and holding the sealing rings in firm engagement with their respective parts.

By this construction it will be readily seen that the lubricant will be prevented from leaving the housing 9 through the opening 10 as the rings 15 and 17 form a permanent seal between the sealing shield and the housing. It will likewise be seen that by providing the spring 18 for constantly directing outward pressure against the sealing shield, the sealing rings will be positively held in engagement with the parts with which they coöperate and any wear thereon compensated for.

The ends of the pivot pin 3 are preferably entered in bushings 19 which are of hardened metal and ground, while the ends of the king pin 6 are entered in similar bushings 20, each of said bushings having a circumferential flange 21 at its inner end which engage seats 22 in the parts in which the bushings are entered. In order to more readily convey lubricant through the bushing, spirally arranged grooves 23 are formed on the interior of the bushings so as to more readily convey lubricant from end to end of the bearing parts.

As the ends of the cross member and the ends of the hub members 5 thereon abut against the flanged ends of the bushings 19 and 20, said ends of the cross member and hubs are provided with radial channels 24 which serve to readily convey the lubricant from the interior of the housing into engagement with the bearing points of the pin 3 and the king pin 6.

The invention claimed is:—

A universal joint mechanism comprising in combination a housing having a spherical portion provided with an opening therethrough, a shaft extending into said housing through said opening, other shaft means supporting said housing and rotatable therewith, a spherically shaped shield for closing said housing opening, said shield being supported upon said first mentioned shaft and being movable therewith and axially thereof, yielding means maintaining the spherical portion of said shield in contact with the spherical portion of said housing, sealing means upon each of the free ends of said housing and said shield and projecting into engagement with the other free end to form a leak-proof lubricant retaining housing, and universal joint means within said lubricant containing housing and connected with both of said shafts for transmitting rotative movement from one shaft to the other, said joint means including a pair of yokes, each being associated with a shaft means, and a cross member connecting said yokes together, said cross member having four rectangularly positioned bearing pins, each provided with an offset flange and associated with a yoke arm, each of said bearings being provided with a spirally arranged groove extending axially of the bearing, and a groove extending radially of the bearing, said grooves supplying lubricant from the housing to the bearing portions.

In witness whereof, I have hereunto affixed my signature.

THOMAS MORRIS HARDY.